United States Patent
Xu et al.

(10) Patent No.: US 12,245,314 B2
(45) Date of Patent: Mar. 4, 2025

(54) MOBILITY STATE-BASED SDT PROCEDURES

(71) Applicant: APPLE INC., Cupertino, CA (US)

(72) Inventors: Fangli Xu, Beijing (CN); Dawei Zhang, Cupertino, CA (US); Haijing Hu, Cupertino, CA (US); Sethuraman Gurumoorthy, Cupertino, CA (US); Srirang A. Lovlekar, Cupertino, CA (US); Yuqin Chen, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 393 days.

(21) Appl. No.: 17/593,229

(22) PCT Filed: Mar. 31, 2021

(86) PCT No.: PCT/CN2021/084523
§ 371 (c)(1),
(2) Date: Sep. 13, 2021

(87) PCT Pub. No.: WO2022/205125
PCT Pub. Date: Jun. 10, 2022

(65) Prior Publication Data
US 2023/0102755 A1 Mar. 30, 2023

(51) Int. Cl.
*H04W 76/27* (2018.01)
*H04W 8/02* (2009.01)
*H04W 76/30* (2018.01)

(52) U.S. Cl.
CPC .......... *H04W 76/27* (2018.02); *H04W 8/02* (2013.01); *H04W 76/30* (2018.02)

(58) Field of Classification Search
CPC ....... H04W 76/27; H04W 8/02; H04W 76/30; H04W 48/18
See application file for complete search history.

(56) References Cited

U.S. PATENT DOCUMENTS

2016/0050602 A1* 2/2016 Cui ............... H04W 48/16
455/436
2018/0092157 A1* 3/2018 Chen .............. H04W 76/27
(Continued)

FOREIGN PATENT DOCUMENTS

CN 102271367 A 12/2011
CN 111194092 A 5/2020
(Continued)

OTHER PUBLICATIONS

Ericsson, "Details of CG based SDT", Tdoc R2-2009964, 3GPP TSG-RAN WG2 #112e, Electronic meeting, Agenda Item 8.6.5, Nov. 2-13, 2020, 4 pages.
(Continued)

*Primary Examiner* — Kibrom T Hailu
(74) *Attorney, Agent, or Firm* — Dorsey & Whitney LLP

(57) ABSTRACT

Systems and methods for small data transmissions (SDTs) between a user equipment (UE) and a network are disclosed herein. In some embodiments, the UE determines whether to perform an SDT procedure by comparing its own mobility state to an SDT mobility state condition provided by the network. The UE may also determine whether to perform the SDT procedure by comparing the size of user plane (UP) data to be sent with the SDT procedure to an SDT mobility-based data amount threshold provided by the network. Upon entering an RRC_INACTIVE state, the UE may start a validity timer relative to any such SDT mobility state condition and/or SDT mobility-based data amount threshold, and invalidate these once the validity timer expires. In some disclosed embodiments, the UE reports its determined mobility state to the network during an SDT procedure so that the network can accordingly select configuration parameters for SDT procedures.

17 Claims, 14 Drawing Sheets

(56) References Cited

U.S. PATENT DOCUMENTS

| | | | | |
|---|---|---|---|---|
| 2019/0394753 A1* | 12/2019 | Adjakple | ............... | H04W 76/10 |
| 2023/0030443 A1* | 2/2023 | Chen | ...................... | H04W 76/38 |
| 2023/0037553 A1* | 2/2023 | Shih | ................ | H04W 36/00835 |
| 2023/0362765 A1* | 11/2023 | Zheng | .................... | H04W 76/28 |
| 2023/0371079 A1* | 11/2023 | Wang | ................ | H04W 74/0833 |
| 2023/0388919 A1* | 11/2023 | Wu | ........................ | H04W 48/20 |
| 2024/0114582 A1* | 4/2024 | Turtinen | ............... | H04W 76/20 |
| 2024/0179762 A1* | 5/2024 | Turtinen | ............... | H04W 24/10 |

FOREIGN PATENT DOCUMENTS

| | | |
|---|---|---|
| CN | 111757556 A | 10/2020 |
| WO | 2020088097 A1 | 5/2020 |
| WO | 2020191059 A1 | 9/2020 |

OTHER PUBLICATIONS

Mediatek Inc., Apple, "RRC-less SDT over CG", R2-2009055, 3GPP TSG-RAN WG2 #112-e, E-meeting, Agenda Item 8.6.3, Nov. 2-13, 2020, 6 pages.

PCT/CN2021/084523, International Search Report and Written Opinion, Jan. 4, 2022, 9 pages.

\* cited by examiner

MOBILITY STATE-BASED SDT PROCEDURES

TECHNICAL FIELD

This application relates generally to wireless communication systems, including wireless communication systems comprising a UE and a network configured to communicate according to a small data transmission (SDT) procedure while the UE is in an RRC_INACTIVE state.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network (CN). Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

In this disclosure, a CN in conjunction with the RAN may be referred to collectively as the "network" or the "wireless network." In such wireless networks, it may be that one or more RRC states of a UE is controlled by a RAN node of the wireless network (e.g., a gNB), in the manner that will be shown below.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
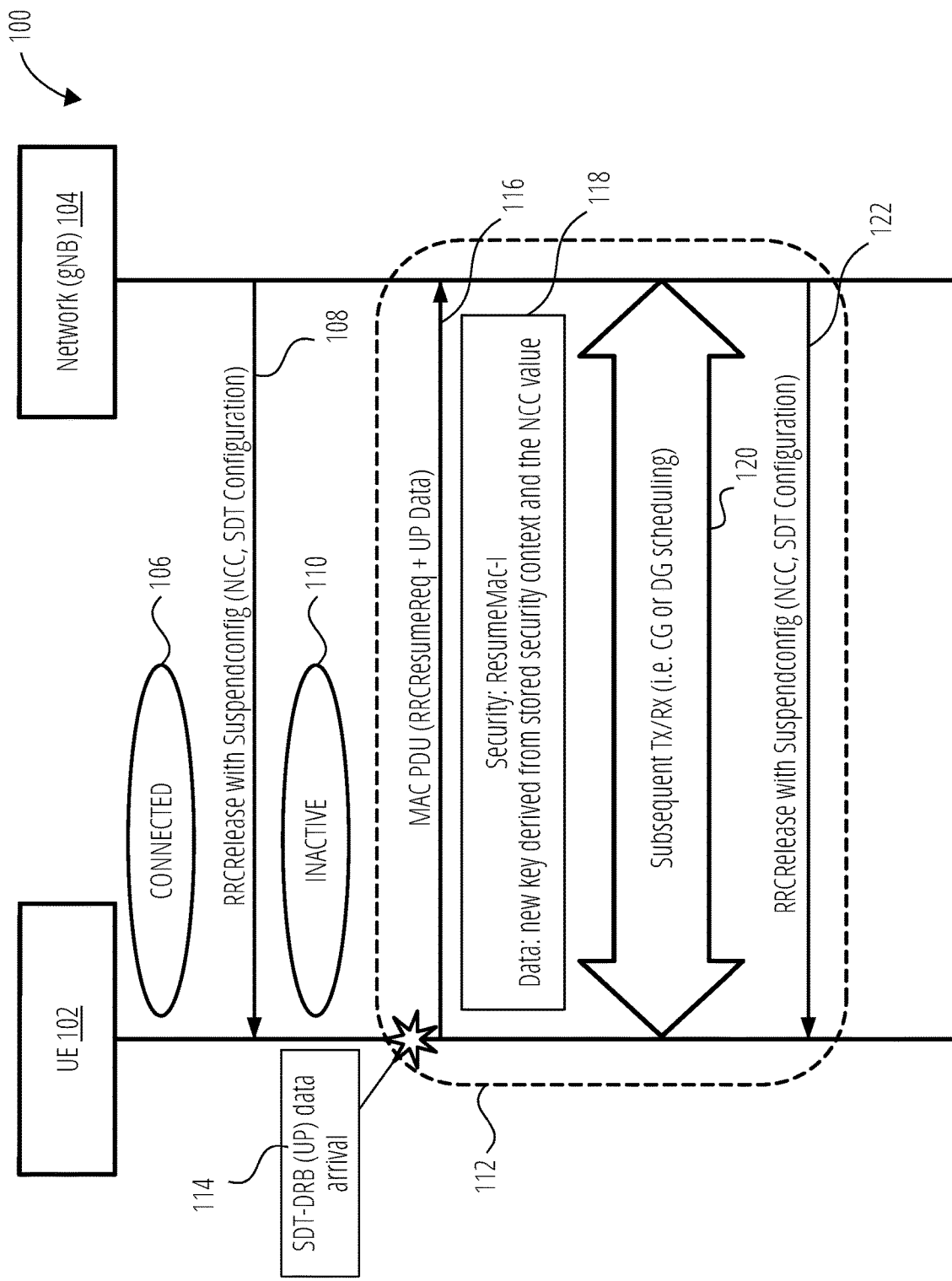
FIG. 1 illustrates a flow diagram for an SDT procedure between a UE and a network, according to an embodiment.

A RAN (such as an NG-RAN) and/or a connected UE may implement and/or use a state machine relative to radio resource control (RRC) aspects of the UE in order to manage an RRC state of the UE in an organized, coherent fashion. Accordingly, in NR, a UE may be in one of an RRC_CONNECTED (CONNECTED) state, an RRC_IDLE (IDLE) state, and an RRC_INACTIVE (INACTIVE) state.

The CONNECTED state, the UE has an active connection to the CN and an established RRC context with the RAN. General data transfer may occur in this state.

In the IDLE state, the UE has neither an active connection to the CN nor an established RRC context with the RAN. In this state, it may be that no data transfer occurs.

In an INACTIVE state, control plane (CP) aspects for the UE include a non-access stratum (NAS) connection to the CN. However, as to an RRC connection of the UE in the INACTIVE state, the UE has no dedicated access stratum (AS) resource (though the UE may, upon entering the INACTIVE state, save an RRC configuration from prior to entering the INACTIVE state).

In the INACTIVE state, user plane (UP) aspects include that the UE does not regularly perform dedicated data transmission and/or reception. To perform such dedicated data transmissions and/or receptions, it may be that the UE first enters a CONNECTED state instead. For example, for a downlink (DL) transmission, a base station of the RAN pages the UE via a RAN-paging mechanism in order to trigger the UE to enter the CONNECTED mode. For an uplink (UL) transmission, the UE triggers a random access channel (RACH) procedure in order to enter the CONNECTED mode.

A state transition at the UE from a CONNECTED state to an INACTIVE state may be triggered by the reception at the UE from the network of an RRCRelease message. This RRCRelease message may also include Suspendconfig information, which may provide configurations for the UE while in the INACTIVE state, such as an RRC Inactive Radio Network Temporary Identity (I-RNTI) for the UE, RAN paging cycle information, and RAN notification area (RNA) information, among other items.

A state transition at the UE from an INACTIVE state to a CONNECTED state may be triggered by the reception at the UE from the network of an RRCResume message.

A state transition at the UE from an INACTIVE state to an IDLE state may be triggered by an RRCRelease message from the network. Alternatively, the UE may drop to an IDLE state from another state when it cannot locate a serving cell.

Finally, note that while in the INACTIVE or IDLE states, the UE may use cell selection and/or reselection to move between cells within an RNA without notifying the NG-RAN. To perform such cell selections and/or reselections (hereinafter discussed jointly as "reselections") at the UE while in the INACTIVE or IDLE state, the UE may measure the power of a neighbor cell and reselect to the new cell if, for example, the measured power level of the neighbor cell is better than the measured power level of the current serving cell by a threshold. When moving between RNAs attendant to such reselections, the UE may be configured to provide to the network NAS registration updates and/or RRC RNA updates, as applicable.

A UE that is in an IDLE or INACTIVE state may evaluate its own mobility state. The mobility state of the UE (as determined by the UE) may correspond to a number of reselections that at UE performs during an evaluation period ($T_{CRmax}$). For example, various mobility state parameters may have been provided to the UE by the network (e.g., prior to the UE entering the IDLE or INACTIVE state). These may include $T_{CRmax}$, a high mobility threshold ($N_{CR\_H}$), a medium mobility threshold ($N_{CR\_M}$), and a hysteresis parameter ($T_{CRmaxHyst}$).

If the number of reselections during $T_{CRmax}$ is less than $N_{CR\_M}$, and no criteria for either a Medium-mobility state or a High-mobility state (e.g., as described below) has been detected within $T_{CRmaxHyst}$, the UE may determine that it is in a Normal-mobility state. If the number of reselections during $T_{CRmax}$ is greater than or equal to $N_{CR\_M}$ but less or equal to than $N_{CR\_H}$, the UE may determine that it is in the Medium-mobility state. If the number of reselections during $T_{CRmax}$ is greater than $N_{CR\_H}$, the UE may determine that it is in the High-mobility state. As discussed herein, these mobility states may be discussed relative to one another in terms of "lower" and "higher" mobility states, with, for example, the relative ordering proceeding from Normal-mobility as a "lowest" mobility state, through the Medium-mobility state, and on to the High-mobility state as the "highest" mobility state. It is contemplated that other/additional mobility states (having, e.g., additional/different mobility thresholds) other than those specifically described herein could be configured for (and ordered) similarly to the manner discussed, and that the disclosure herein related to the use of mobility states could be appropriately extended to account for/use these other/additional mobility states.

See 3rd Generation Partnership Project (3GPP) Technical Specification (TS) 38.304, "User Equipment (UE) procedures in Idle mode and RRC Inactive state (Release 16)" (version 16.3.0, December 2020), Section 5.2.4.3 for additional details regarding mobility state determinations at the UE.

In certain embodiments, a UE may report its mobility state in an initial access procedure, using an RRCSetupComplete message or an RRCResumeComplete message.

It has been recognized that many modern applications for UEs may implement the transmission of small amounts of data in the UP to the network. Further, these small data UP transmissions may be infrequent, relatively speaking. For example, a UE may need to report a single sensor reading, a small amount of text, etc., and/or to report such data at only infrequent intervals. It has been recognized that in some of these cases, the transition of the UE to a CONNECTED mode in order to perform these small data transmissions (as described above) involves the use of relatively large amounts of network resources (in the form of signaling between the network and the UE, computation at each of the network and the UE, and time) as compared to the small amount of data that is to be transmitted.

In LTE, to reduce the amount of overhead related to the transmission of a small amounts of data, certain optimizations may have been made (e.g., the re-use of a NAS security context, and the relaxation of any expectation of acknowledgment above an RRC layer). However, these transmissions may still have required the UE to be in (moved to) an (LTE) RRC Connected state.

In NR, a small data transmission (SDT) procedure may be used at a UE that is in an INACTIVE mode that does not require a transition of the UE from the INACTIVE to a CONNECTED state in order to perform such transmissions of small amounts of data. Such an SDT procedure may provide a mechanism for the transmission of UP data in an uplink (UL) direction while the UE remains in an INACTIVE state. Further, it is contemplated that follow up transmissions (in either downlink (DL) or UL) may also be economically incorporated into the SDT procedure, as will be shown (again, while the UE remains in the INACTIVE state). Because a state change from INACTIVE to CONNECTED is not required, the SDT procedure may use relatively fewer network resources than existing methods to complete such transmission(s). Finally, the SDT procedure may be random access channel (RACH) procedure based, or it may use pre-configured physical uplink shared channel (PUSCH) resources.

Additional details regarding such NR SDT procedures can be found in 3GPP Work Item Description RP-193252, "New Work Item on NR small data transmissions in INACTIVE state," 3GPP TSG RAN Meeting #86, Sitges, Spain, Dec. 9th-12th, 2019.

FIG. 1 illustrates a flow diagram 100 for an SDT procedure 112 between a UE 102 and a network 104, according to an embodiment. As illustrated, the transmission and receptions on the side of the network 104 may occur via a gNB of the network 104.

As illustrated, the flow diagram 100 begins with the UE 102 in a CONNECTED state 106. The network 104 then sends the RRCRelease with Suspendconfig message 108. The RRCRelease with Suspendconfig message 108 may include a Next Hop Chaining Counter (NCC) value and SDT configuration information. The SDT configuration information may include information such as whether the network is configured to use an SDT procedure 112, a data radio bearer (DRB) (SDT-DRB) associated with the SDT procedure 112, bandwidth parts (BWPs) to use with the SDT procedure 112, and/or an overall SDT data amount threshold that sets an upper limit on an amount (or size) of UP data that can initiate the SDT procedure 112.

Upon receiving the RRCRelease with Suspendconfig message 108, the UP operation between the UE 102 and the network 104 may be modified such that a medium access control (MAC) context is reset, radio link control (RLC) for signaling radio bearer (SRB) 1 is re-established, and SRB2 and any data radio bearers (DRBs) are suspended. The UE 102 then enters the INACTIVE state 110.

The flow diagram 100 then illustrates the SDT procedure 112. This SDT procedure 112 begins with the arrival 114 of UP data at the UE 102 (e.g., from an application layer of the UE 102) to be sent according to the SDT procedure 112. This UP data may be for the associated SDT-DRB for the SDT procedure 112. The UE 102 may check to ensure that, for example, the UP data may be sent within any constraints provided in the SDT configuration that was received from the RRCRelease with Suspendconfig message 108 (such as determining that the network is configured to receive an SDT procedure generally).

The UE 102 may then send a MAC PDU 116 to the network 104 that contains an RRCResumeRequest message and the UP data to be sent according to the SDT procedure 112. The presence of the UP data within the MAC PDU 116 may be indicative to the network 104 that the UE 102 is attempting to initiate the SDT procedure 112, allowing the network 104 to respond according to the SDT procedure 112 as illustrated.

The MAC PDU 116 of the SDT procedure 112 may resume using the message authentication code for integrity (MAC-I) for the UE authentication. The data may be encrypted with a new key derived from a stored security context (e.g., from when the UE 102 transitioned from the CONNECTED state 106 to the INACTIVE state 110), and the NCC value received in the RRCRelease with Suspendconfig message 108.

The SDT procedure 112 may further include the subsequent transmission(s)/reception(s) 120. For example, the network 104 may provide one or more additional configured (periodic) grants for the UE to use as part of the SDT procedure 112 (CG-SDTs) (in UL and/or DL) and/or one or more dynamic grants (DG-SDTs) (in UL or DL) for the UE to use as part of the SDT procedure 112. These subsequent transmission(s)/reception(s) 120 may be responsive to additional data transfer that are triggered by/inferred from, for example, the nature of the UP data that is sent from the UE 102 to the network 104 as part of the MAC PDU 116 at the beginning of the SDT procedure 112. The subsequent transmission(s)/reception(s) 120 may occur on one or more BWPs that is are configured as part of the SDT configuration within the RRCRelease with Suspendconfig message 108, and/or may be BWP(s) that were used when the UE was in the CONNECTED state 106 (the identities of which were stored upon the UE moving to the INACTIVE state 110.

The subsequent transmission(s)/reception(s) 120 are optional, in that in some cases the SDT procedure 112 needs only to transfer the UP data included in the MAC PDU 116 from the UE 102 to the network 104 (and no additional transmissions in either UL or DL are necessary as part of the SDT procedure 112).

The SDT procedure 112 ends when the network 104 sends the UE 102 an RRCRelease with Suspendconfig message 122. This RRCRelease with Suspendconfig message 122 may include and NCC and a SDT Configuration (similarly as to the RRCRelease with Suspendconfig message 108), which may be used during, e.g., any follow up SDT procedure that is to be performed after the SDT procedure 112 (not illustrated).

It is noted that the entire SDT procedure 112 is performed while the UE remains in the INACTIVE state 110.

Figure 2:
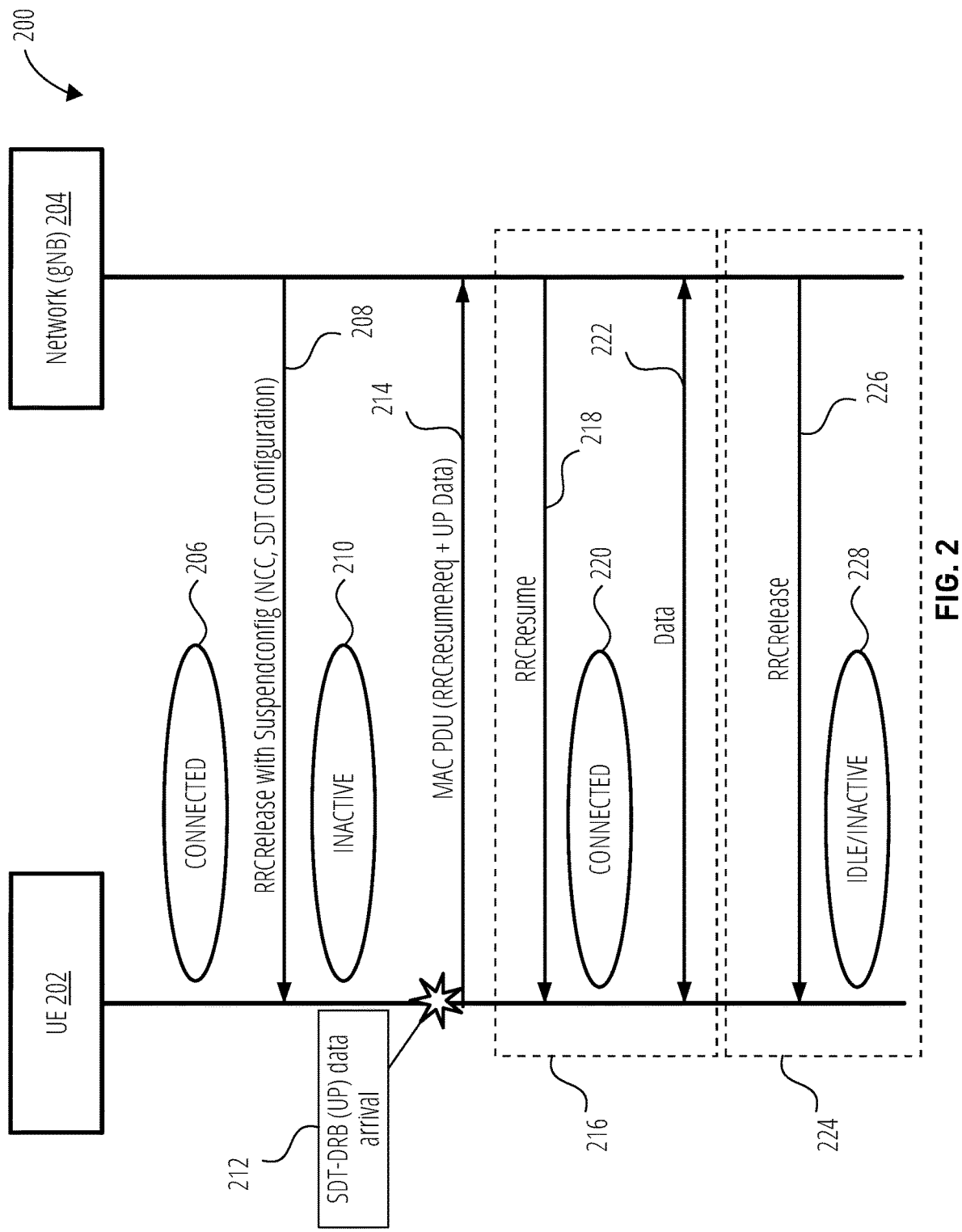
FIG. 2 illustrates a flow diagram for a transition from an INACTIVE state to a CONNECTED state, or for a transition from an INACTIVE state to an IDLE state (or the continued use of an INACTIVE state), according to various embodiments.

FIG. 2 illustrates a flow diagram 200 for a transition from an INACTIVE state 210 to a CONNECTED state 220, or for a transition from an INACTIVE state 210 to an IDLE state 228 (or the continued use of an INACTIVE state 228), according to various embodiments. As illustrated, the transmission and receptions on the side of the network 204 may occur via a gNB of the network 204. The flow diagram 200 may act as a fallback functionality if, for example, the SDT procedure of FIG. 1 fails or otherwise cannot be completed.

The flow diagram 200 begins much as was described in relation to the flow diagram 100 of FIG. 1, with the UE 202 moving from the CONNECTED state 206 to the INACTIVE state 210 due to an RRCRelease with Suspendconfig message 208, with a subsequent arrival 212 of UP data. However, in the case of the flow diagram 200, when the MAC PDU 214 having the illustrated UP data is received at the network 204 (with the presence of the UP data signaling to the network 204 that the UE is attempting to initiate an SDT procedure), it happens that the network determines that the SDT procedure should not be used for UE dedicated transmissions.

In some cases, the network may choose not to perform the SDT procedure because, for example, a current radio quality at the UE is poor, or an amount of data available at the UE it relatively large. In these cases the network may instead move the UE to the CONNECTED state, as illustrated by the first case 216. Accordingly, rather than performing an SDT procedure, the network 204 responds to the MAC PDU 214 with an RRCResume message 218. The UE 202 enters the CONNECTED state 220, during which data 222 that may have otherwise been sent and/or received according to an SDT procedure (see FIG. 1) is sent and/or received.

In other cases, the network may instead move the UE 202 to an IDLE state (or have the UE 202 continue with the INACTIVE state), as illustrated by the second case 224. In these cases, the network 204 sends an RRCRelease message 226 to the UE 202, and the UE 202 uses the state 228 (which may be IDLE or INACTIVE) in response. The operation of the second case 224 may be driven by network load concerns (e.g., when the network is overloaded and cannot handle a current SDT procedure with the UE 202).

The determination, at the UE, of when to initiate an SDT procedure may be improved by incorporating analyses related to a current mobility state of the UE. For example, it may be advantageous to prohibit a UE in a relatively higher mobility state to initiate an SDT procedure with a network (and/or for the network not to accede to an SDT procedure with such a UE). This may be because such a high-mobility UE may be understood to have (based on its relatively high mobility between cells) a corresponding higher likelihood of falling out of range of a (current) serving cell during such an SDT procedure. This may be undesirable, in that it may be that an SDT procedure may not account for/allow for handover of the UE while in the middle of the SDT procedure. For example, there may be no defined manner for the UE to establish, e.g., SIB(s), DRB(s), security contexts, etc., with a new cell in the middle of an ongoing SDT procedure. Instead, the UE may simply fall to an IDLE state instead.

Further, at least some SDT procedures may use CG-STDs for the UE (e.g., as some or all of the subsequent transmission(s)/reception(s) 120 of FIG. 1), which may become unusable by the UE if the UE moves out of range of the current serving cell (as these cannot be used across different cells), potentially ultimately causing these network resources to be wasted and/or causing the network to spend additional resources recovering the resources associated with these CG-STDs for other uses.

Accordingly, it may be advantageous to have a UE with a relatively higher mobility to instead use a CONNECTED state with the network to perform UP data transmissions (even in the small data case) in order to avail itself of handover procedures and grant configurations that are available in the CONNECTED state and which account for these issues.

Figure 3:
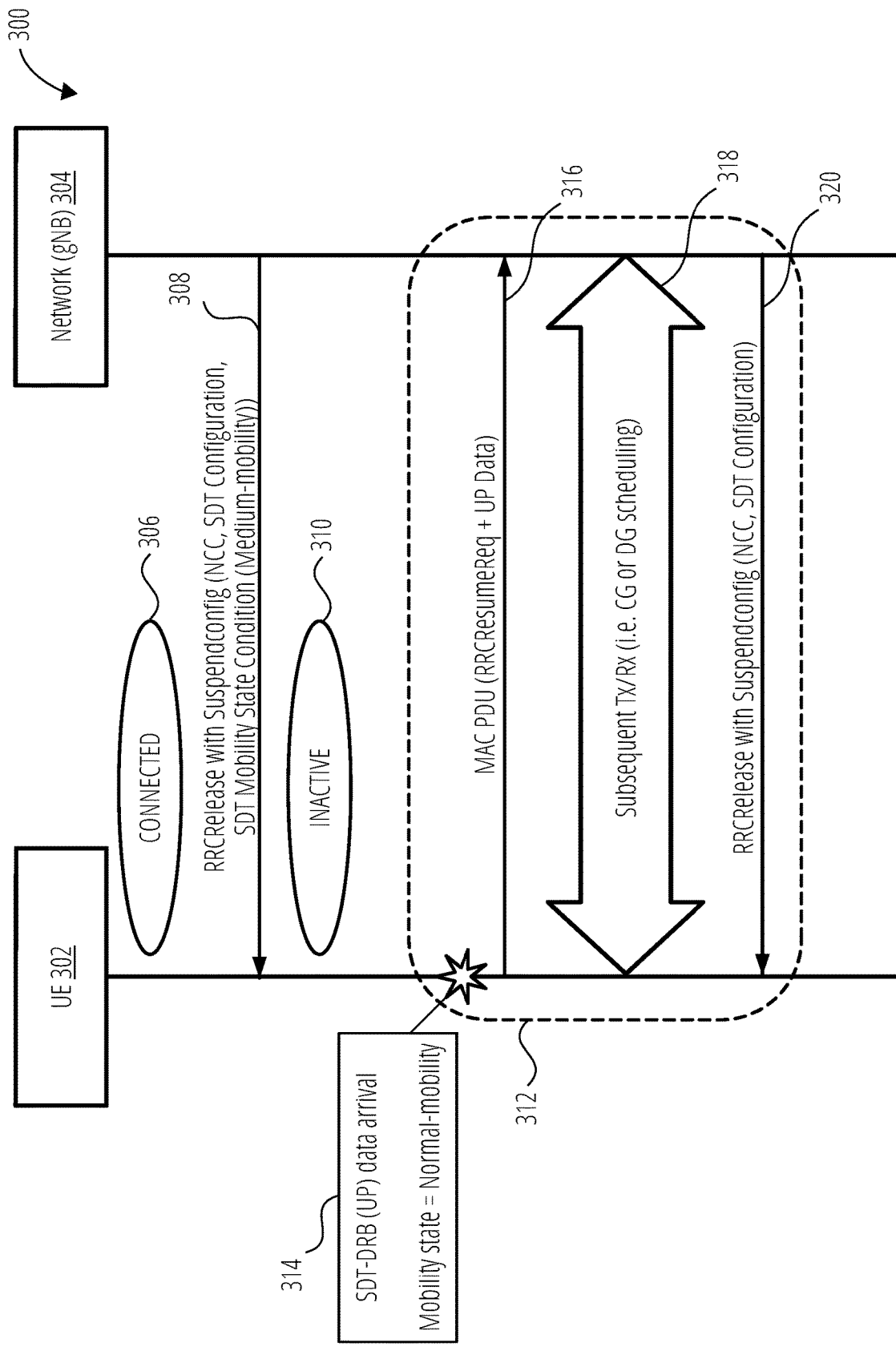
FIG. 3 illustrates a flow diagram for aspects related to an SDT procedure between a UE and a network, according to an embodiment.

FIG. 3 illustrates a flow diagram 300 for aspects related to an SDT procedure 312 between a UE 302 and a network 304, according to an embodiment. As illustrated, the transmission and receptions on the side of the network 104 may occur via a gNB of the network 104.

As illustrated, the flow diagram 300 begins with the UE 302 in the CONNECTED state 306. The network 304 then sends the RRCRelease with Suspendconfig message 308. The RRCRelease with Suspendconfig message 308 may include a Next Hop Chaining Counter (NCC) value and SDT configuration information, as these described above in relation to FIG. 1. The RRCRelease with Suspendconfig message 308 further includes a mobility state condition. This mobility state condition indicates the UE a highest mobility state for which SDT procedures should be allowed. In the example of FIG. 3, the mobility state condition sent by the network 304 to the UE 302 corresponds to a Medium-mobility state. However, it is contemplated that the network 304 could alternatively use the mobility state condition to indicate a Normal-mobility state (in the case that the network 304 wanted to be more conservative regarding potential movement of the UE 302 away from the serving cell) and/or a High-mobility state (e.g., in the case that the network 304 wants to be less conservative in this regard). Note that is contemplated that this mobility state condition may be, in some embodiments, included within the SDT configuration rather than be present in the RRCRelease with Suspendconfig message 308 as a separate item.

Upon receiving the RRCRelease with Suspendconfig message 308, the UP operation between the UE 302 and the network 304 may be modified as described above relative to FIG. 1. The UE 302 then enters the INACTIVE state 310.

The flow diagram 100 then illustrates the SDT procedure 312. This SDT procedure 312 begins with the arrival 314 of UP data at the UE 302 (e.g., from an application layer of the UE 102) to (potentially) be sent according to the SDT procedure 312. This UP data may be associated with a SDT-DRB for the SDT procedure 312. Further, the UE 302 may check to ensure that, the use of an SDT procedure in this instance is compatible with, for example, the received SDT configuration generally, as described above.

In the case of the flow diagram 300, the UE 302 may also determine its own mobility state. For example, as illustrated, at the arrival 314 of the UP data to be (potentially) transmitted according to the SDT procedure 312, the UE 302 determines that its current mobility state is Normal-mobility. This determination may be according to mobility state parameters (previously) received from the network 304, in the manner described above. The UE 302 then compares its current mobility state (Normal-mobility) to the mobility state condition received in the RRCRelease with Suspendconfig message 308 (Medium-mobility), and determines that because its current mobility state (Normal-mobility) is lower than or equal to (or in some embodiments, strictly lower than) the mobility state condition received in the RRCRelease with Suspendconfig message 308 (Medium-mobility), the UE 302 may proceed with the SDT procedure 312.

Accordingly, the UE 302 sends a MAC PDU 316 with an RRCResumeRequest and the UP data in order to use the SDT procedure 312 with the network 304, similarly as described in relation to the flow diagram 100 of FIG. 1 above. If instead, at the arrival 314 the UE 302 had determined its current mobility state to be greater than (or in some embodiments, greater than or equal to) the mobility state condition received in the RRCRelease with Suspendconfig message 308 (e.g., the configured mobility state condition is set to Medium-mobility, but at the time of the arrival 314 the UE is in a High-mobility state), the UE 302 may have instead proceeded to trigger an RRC resume procedure to request to enter the CONECTED state for the transmission of the data (and any follow up transmissions/receptions).

While not illustrated here, any security aspects of the SDT procedure 312 may correspond to those described in relation to the security configuration 118 described in relation to FIG. 1.

The SDT procedure 312 may further include the subsequent transmission(s)/reception(s) 318, similarly to the manner that was described in relation to the subsequent transmission(s)/reception(s) 120 of FIG. 1. Particularly, the network 304 may feel free to schedule these subsequent transmission(s)/reception(s) 318 according to CG-STDs for the UE (which may configure for a plurality of grants occurring across time) as opposed to perhaps using only DG-STDs (which have a shorter lifespan than CG-STDs) in the subsequent transmission(s)/reception(s) 120, due to the relatively increased likelihood that the UE 302 will not soon leave the current serving cell (as ensured via the use of the mobility state condition check at the UE 302).

The SDT procedure 312 ends when the network 304 sends the UE 302 an RRCRelease with Suspendconfig message 320, similarly to the RRCRelease with Suspendconfig message 122 of FIG. 1 described above.

The determination of when to use an SDT procedure may be improved by incorporating analyses related to a data size to be sent using the SDT procedure. For example, it may be advantageous to limit a data size to be sent using the SDT procedure, as more limited data can be transmitted in less time, decreasing the overall likelihood of UE going out of range of its current serving cell during the SDT procedure (and implicating this issues discussed above in relation to this possibility).

Figure 4:
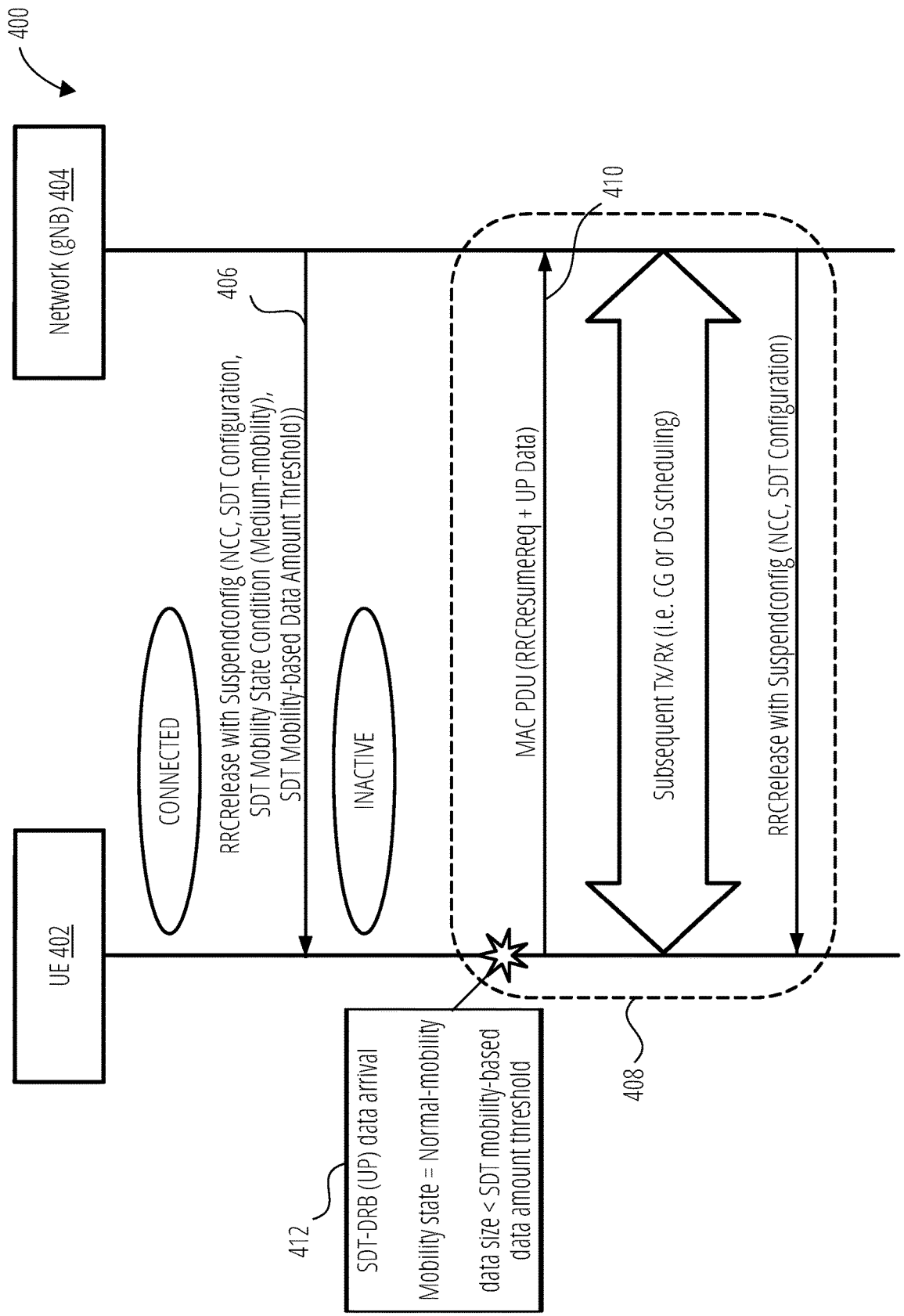
FIG. 4 illustrates a flow diagram for aspects related to an SDT procedure between a UE and a network, according to an embodiment.

FIG. 4 illustrates a flow diagram 400 for aspects related to an SDT procedure 408 between a UE 402 and a network 404, according to an embodiment. As illustrated, the transmissions and receptions on the side of the network 404 may occur via a gNB of the network 404.

The flow diagram 400 of FIG. 4 may be similar to the flow diagram 300 of FIG. 3. However, in the RRCRelease with Suspendconfig message 406, further information in the form of an SDT mobility-based data amount threshold may be received. This SDT mobility-based data amount threshold may act to limit the amount of UP data that may be trigger the use of the using the SDT procedure 408. This SDT mobility-based data amount threshold may replace the use of an SDT data amount threshold that is (or that would otherwise be) sent in the SDT configuration (e.g., as described above in relation to FIG. 1). Or, an SDT mobility-based data amount threshold may be used even in cases where an SDT data amount threshold as described in relation to FIG. 1 is not already being used to limit the use of SDT procedures at the UE 402.

The network may set this SDT mobility-based data amount threshold for triggering an SDT procedure that corresponds to (e.g., is determined at the network based on) an SDT mobility state condition that is simultaneously sent in the RRCRelease with Suspendconfig message 406. For example, a relatively lower SDT mobility-based data amount threshold may be used with a relatively higher SDT mobility state condition. This may allow for the use of higher SDT mobility state conditions than may be otherwise used (e.g., compared to embodiments according to FIG. 3), as the lower SDT mobility-based data amount threshold may act to help ensure that even a UE that is configured to use the relatively higher mobility state condition and that has a relatively high mobility state can still likely complete a transmission of the UP data included in the MAC PDU 410 of the SDT procedure 408 without going out of range of the serving cell during such a transmission. Accordingly, the use of an SDT mobility-based data amount threshold (in some cases, instead of a generalized SDT data amount threshold (as in FIG. 1)) may allow the network to more properly account for various potential mobility states of the UE 402.

It is contemplated that the SDT mobility-based data amount threshold may, in some embodiments, be included in the SDT configuration of the RRCRelease with Suspendconfig message 406 rather than being sent as a separate information item in the RRCRelease with Suspendconfig message 406.

Accordingly, at the arrival 412 of the UP data to (potentially) be sent according to the SDT procedure 408, the UE 402 (as illustrated) checks its current mobility against the SDT mobility condition received in the RRCRelease with Suspendconfig message 406 (as in FIG. 3) and also checks that the size of such UP data is less than (or in other embodiments, less than or equal to) the SDT mobility-based data amount threshold received in the RRCRelease with Suspendconfig message 406. If the current mobility state of the UE 302 is lower than or equal to (or in some embodiments, strictly lower than) the mobility state condition, and if the size of the UP data to be sent in the MAC PDU 410 is less/lower than or equal to (or in some embodiments, strictly less/lower than) the SDT mobility-based data amount threshold, the UE 302 triggers the SDT procedure 408 as illustrated. If this is not the case, the UE may instead trigger an RRC resume procedure to request to enter the CONNECTED state for the transmission of the data (and any follow-up transmissions/receptions).

Figure 5:
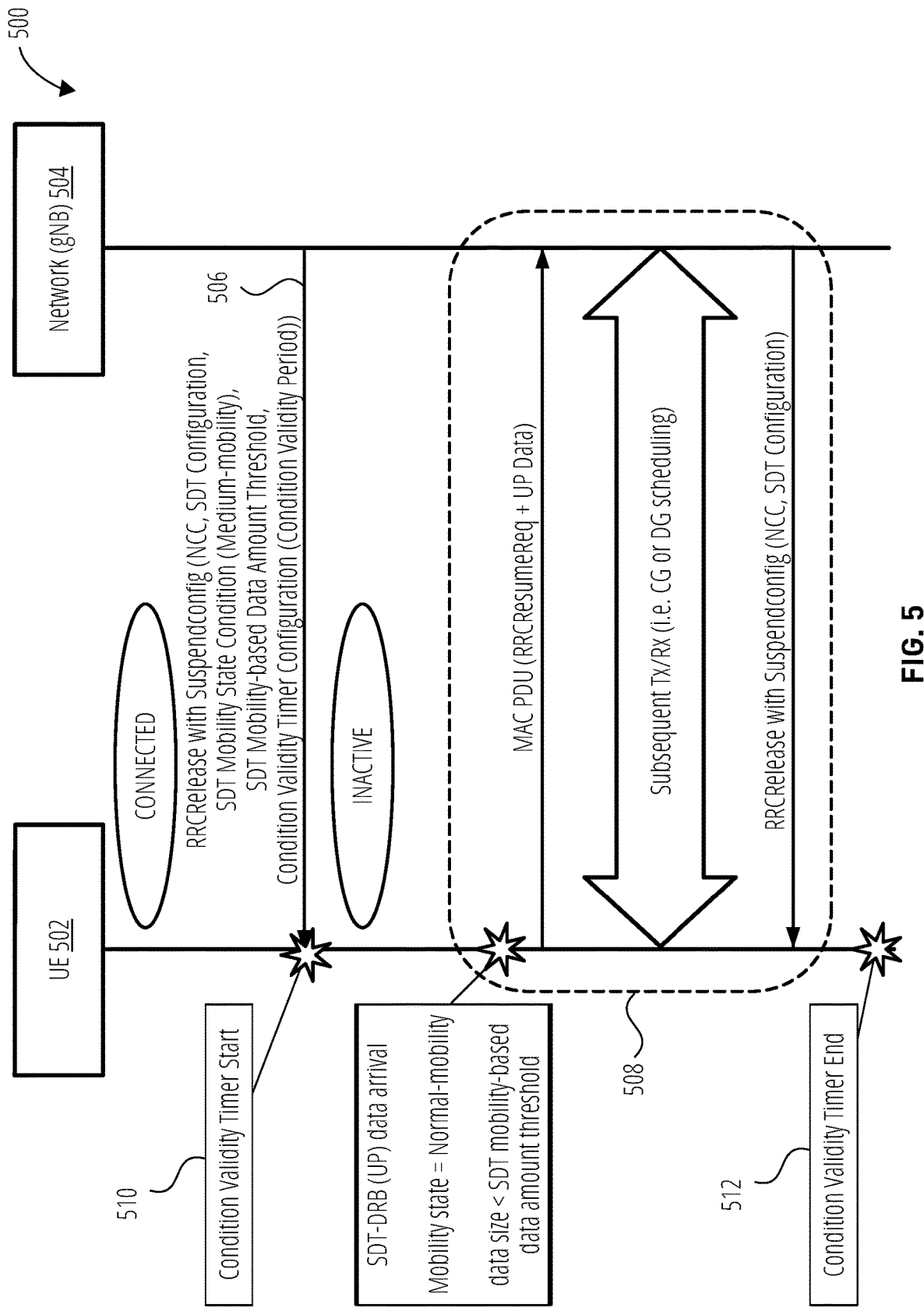
FIG. 5 illustrates a flow diagram for aspects related to an SDT procedure between a UE and a network, according to an embodiment.

FIG. 5 illustrates a flow diagram 500 for aspects related to an SDT procedure 508 between a UE 502 and a network 504, according to an embodiment. As illustrated, the transmissions and receptions on the side of the network 504 may occur via a gNB of the network 504.

A condition validity period for one or more of, for example, the SDT mobility state condition (described in relation to FIG. 3) and/or the SDT mobility-based data amount threshold (described in relation to FIG. 4) may be used that limits the time during which a UE considers these items valid and/or useable as described above. The use of the SDT mobility state condition and/or the SDT mobility-based data amount threshold (as applicable) as limited by such a condition validity period may allow the network to more reliably predict and/or control the UE's use of SDT procedure(s) according to these aspects.

The condition validity period may be a period of time that is predefined by a standard. Alternatively, the condition validity period may be signaled to the UE by the network 504. This case is illustrated in FIG. 5, where the RRCRelease with Suspendconfig message 506 has been shown to include a condition validity timer configuration (which indicates the condition validity period).

In either the predefined condition validity period or the configured condition validity period case, upon receipt of the RRCRelease with Suspendconfig message 506, the UE 502 may start 510 a condition validity timer, during which the UE 502 will use, for example, the SDT mobility state condition (and the SDT mobility-based data amount threshold, if present) as found within the RRCRelease with Suspendconfig message 506, in the manner previously described. (Note that the presence of the SDT mobility-based data amount threshold in the RRCRelease with Suspendconfig message 506 is not strictly required, as it is also contemplated that an SDT validity time configuration may be used as described here in embodiments according to FIG. 3, which does not use an SDT mobility-based data amount threshold). The UE 502 and the network 504 may then proceed with the SDT procedure 508 as illustrated, along the lines as described previously.

Once the condition validity timer ends 512, the UE 502 may invalidate one or more of the SDT mobility state condition and the SDT mobility-based data amount threshold as previously received. In this case, the UE may then proceed to subsequently use SDT procedures without checking its mobility state and/or a data size, as applicable, until a further SDT mobility state condition and/or SDT mobility-based data amount threshold is received from the network 504.

FIG. 3, through FIG. 5 illustrate examples of dedicated UE signaling for one or more of an SDT mobility state condition, an SDT mobility-based data amount threshold, and/or a condition validity timer configuration (e.g., where one or more of these is sent on an RRCRelease with Suspendconfig message that is specifically for or dedicated to that UE).

In such dedicated cases, it is anticipated that in some embodiments, not every RRCRelease with Suspendconfig message used may include the one or more of an SDT mobility state condition and/or an SDT mobility-based data amount threshold (as applicable), and the UE can use these settings as received in an RRCRelease with Suspendconfig message other than a most recent RRCRelease with Suspendconfig message received from the wireless network. For example, it may be that after an initial receipt of an RRCRelease with Suspendconfig message attendant to moving from a CONNECTED state to an INACTIVE state (such as the RRCRelease with Suspendconfig message 308 of FIG. 3, the RRCRelease with Suspendconfig message 406 of FIG. 4, and/or the RRCRelease with Suspendconfig message 506 of FIG. 5), this information may not necessarily be provided in a follow up RRCRelease with Suspendconfig message (e.g., at the end of an SDT procedure, such as the RRCRelease with Suspendconfig messages illustrated at the end of the SDT procedure 312 of FIG. 3, the SDT procedure 408 of FIG. 4, and the SDT procedure 508 of FIG. 5). Rather, a UE may be configured to re-use the one or more of the an SDT mobility state condition and/or an SDT mobility-based data amount threshold from the first RRCRelease with Suspendconfig message. Accordingly, any following SDT procedures in any of FIG. 3, FIG. 4, and FIG. 5 (not illustrated) may use these items as received in the first RRCRelease with Suspendconfig message. This re-use of any SDT mobility state condition and/or an SDT mobility-based data amount threshold received in an RRCRelease with Suspendconfig message other than a most recent RRCRelease with Suspendconfig message may be further subject to the expiration of any related condition validity timer, as described above.

In some alternative cases where any follow up RRCRelease with Suspendconfig message is received without any of an SDT mobility state condition and/or an SDT mobility-based data amount threshold, the UE may alternatively interpret this as an implicit (and immediate) release from the use of any prior SDT mobility state condition and/or SDT mobility-based data amount threshold (as applicable) from, e.g., any prior RRCRelease with Suspendconfig message.

Figure 6:
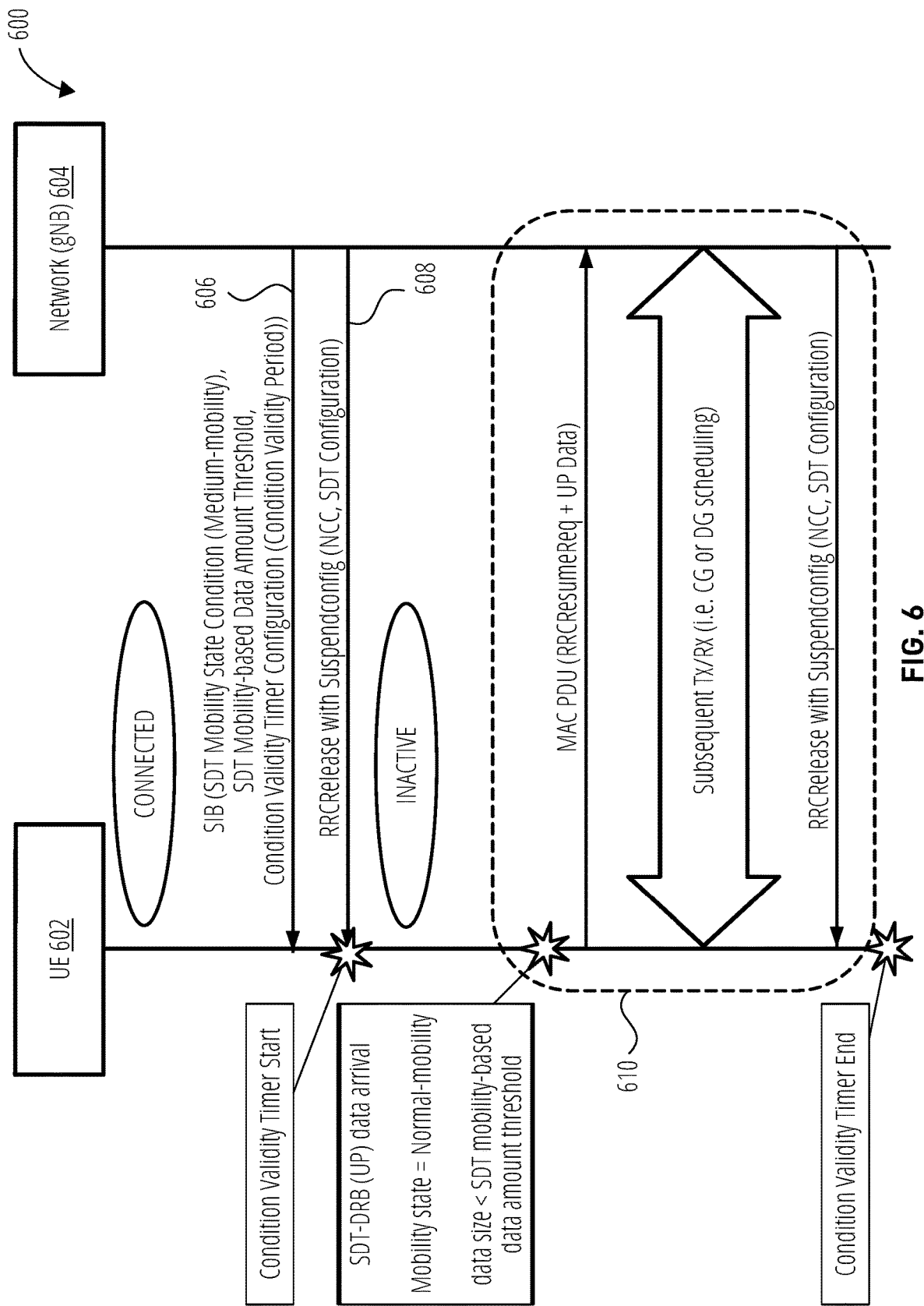
FIG. 6 illustrates a flow diagram for aspects related to an SDT procedure between a UE and a network, according to an embodiment.

FIG. 6 illustrates a flow diagram 600 for aspects related to an SDT procedure 610 between a UE 602 and a network 604, according to an embodiment. As illustrated, the transmissions and receptions on the side of the network 604 may occur via a gNB of the network 604.

FIG. 6 illustrates a case where one or more of an SDT mobility state condition, an SDT mobility-based data amount threshold, and/or a condition validity timer configuration is sent according to broadcast signaling (as opposed to the dedicated cases of FIG. 3, FIG. 4, and FIG. 5. It is contemplated that the UE 602 may become informed of one or more of an SDT mobility state condition, an SDT mobility-based data amount threshold, and/or a condition validity timer configuration via, for example, a system information block (SIB) 606 that is broadcast to all UEs of a cell that that contains one or more of these items of information. Then, these (previously received) parameters are used upon the receipt of the UE 602 of the RRCRelease with Suspendconfig message 608 for any subsequent SDT procedure 610, analogously to the manner described in relation to FIG. 3 through FIG. 5.

In such cases, if any one or more of a SDT mobility state condition, an SDT mobility-based data amount threshold, and/or a condition validity timer configuration is received via both dedicated and broadcast signaling, the SDT mobility state condition, an SDT mobility-based data amount threshold, and/or the condition validity timer configuration of the dedicated signaling may take priority.

Further, in some embodiments where a UE is aware of one or more of an SDT mobility state condition and/or an SDT mobility-based data amount threshold (whether by dedicated or broadcast signaling), and fails to receive the one or more of these items from either following dedicated or broadcast signaling, the UE may interpret this as an implicit (and immediate) release from the use of any prior SDT mobility state condition and/or SDT mobility-based data amount threshold (as applicable) from, for example, any prior dedicated or broadcast signaling.

The determination, by the network, of various configuration parameters for an SDT procedure with a UE can be improved at the network if a current mobility state of the UE is known at the network. This may the allow the network to control for whether to continue to use SDT with the UE (or to instead request the UE to enter the CONNECTED state) based on that received mobility state. For example, based on the received mobility state, a network may select and/or change configuration parameters such as mobility state parameters provided the UE (such as the $N_{CR\_H}$ and $N_{CR\_M}$, as discussed above, which may have the effect of changing what mobility states are in play at the UE), a maximum lifespan for any CG-STDs provided to the UE to use during an SDT procedure, and a maximum duration to allow a UE to operate within a single SDT procedure. Accordingly, it is contemplated that a UE may determine its mobility state (in the manner described above) and report this mobility state to the network during an SDT procedure.

Figure 7:
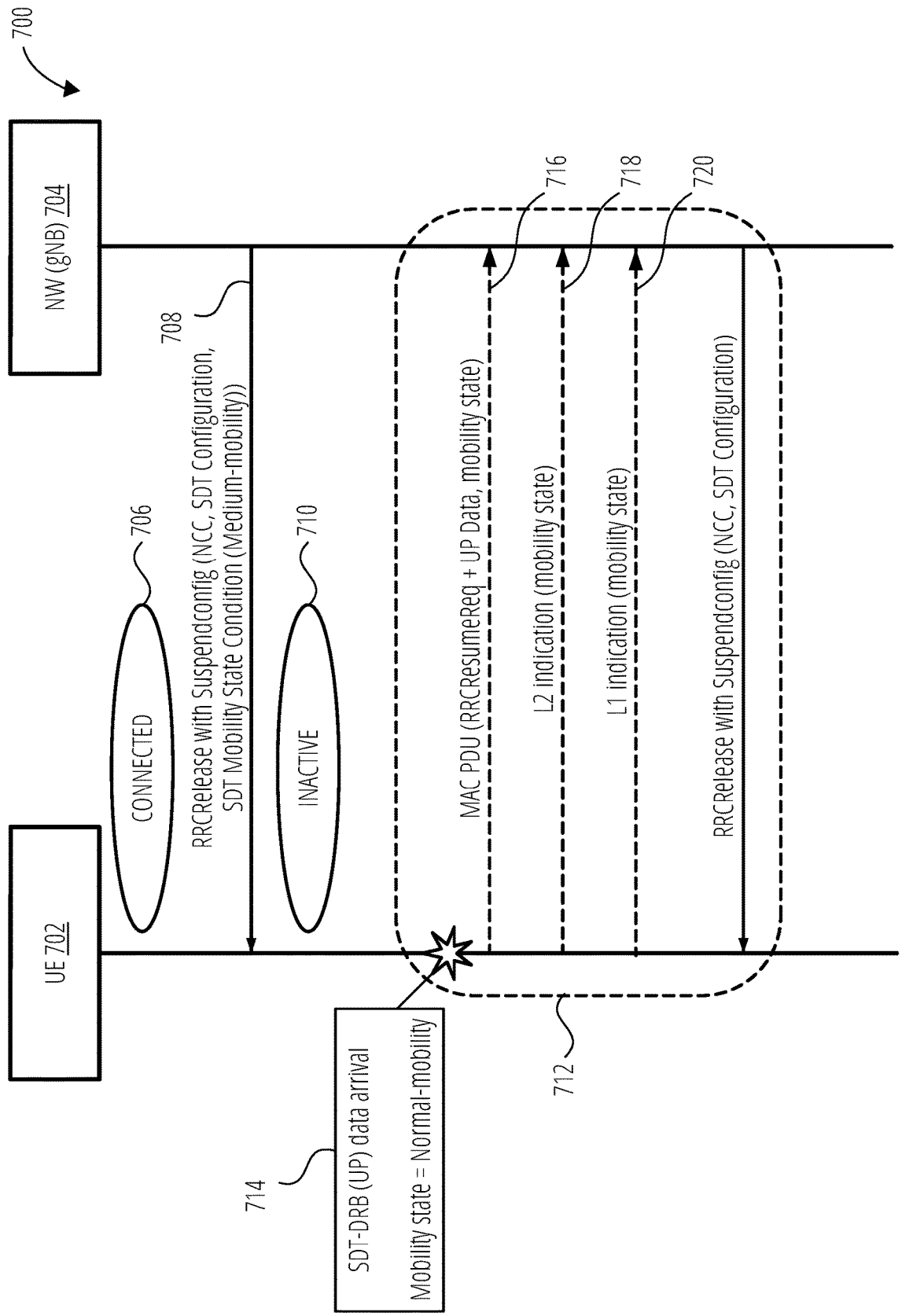
FIG. 7 illustrates a flow diagram for various embodiments of a UE reporting its mobility state to a network during an SDT procedure.

FIG. 7 illustrates a flow diagram 700 for various embodiments of a UE 702 reporting its mobility state to a network 704 during an SDT procedure 712. As illustrated, the transmissions and receptions on the side of the network 704 may occur via a gNB of the network 704. As illustrated, the UE 702 starts in a CONNECTED state 706. From here, the flow diagram 700 may be similar to the flow diagram 300 of FIG. 3, in that the network 704 sends the UE 702 an RRCRelease with Suspendconfig message 708 containing an SDT mobility state condition (among other items). In response, the UE 702 changes to an INACTIVE state 710, prior to entering the SDT procedure 712.

In a first case, upon the arrival 714 of UP data to be sent during, for example, the MAC PDU 716 of the SDT procedure 712 (in the manner described above), the UE 702 may send that MAC PDU 716 with an RRCResumeRequest message and the UP data. However, in this first case, the UE 702 may also include the mobility state of the UE 702 in the MAC PDU 716 (and in this case, it may be considered to be part of the RRCResumeRequest message, or alternatively as a separate information item from the RRCResumeRequest message).

In a second case, upon the arrival 714 of UP data to be sent during, for example, the MAC PDU 716 (but without the mobility state information illustrated therein) of the SDT procedure 712, the UE 702 may report the mobility state of the UE 702 to the network 704 in an L2 indication 718. For example, a MAC CE may be used to make this indication after a successful initial access of the SDT procedure 712 between the UE 702 to the network 704.

In a third case, upon the arrival 714 of UP data to be sent during, for example, the MAC PDU 716 (but without the mobility state information illustrated therein) of the SDT procedure 712, the UE 702 may report the mobility state of the UE 702 in L1 signaling 720 of the SDT procedure 712. For example, the mobility state may be indicated in an L1 PUCCH or in uplink control information (UCI).

The reporting according to any of the first, second, and/or third cases as described herein may be controlled by the network 704 via (previously received) RRC signaling from the network 704 to the UE 702.

It is further contemplated that mobility state reporting to the network as described in relation to FIG. 7 could be combined/used with any of the SDT procedures described herein that use a mobility state condition (and potentially an SDT mobility-based data amount threshold) to determine whether the SDT procedure is used, as described in relation to FIG. 3 through FIG. 6 above. It is also contemplated that this mobility state reporting to the network as described in FIG. 7 could be used during an SDT procedure that is not conditional based on a received mobility state configuration received from the network (e.g., could also be used with an SDT procedure as in the SDT procedure 112 of FIG. 1, which does not use a network provided mobility state condition to test whether to perform the SDT procedure 112 in the first instance).

Figure 8:
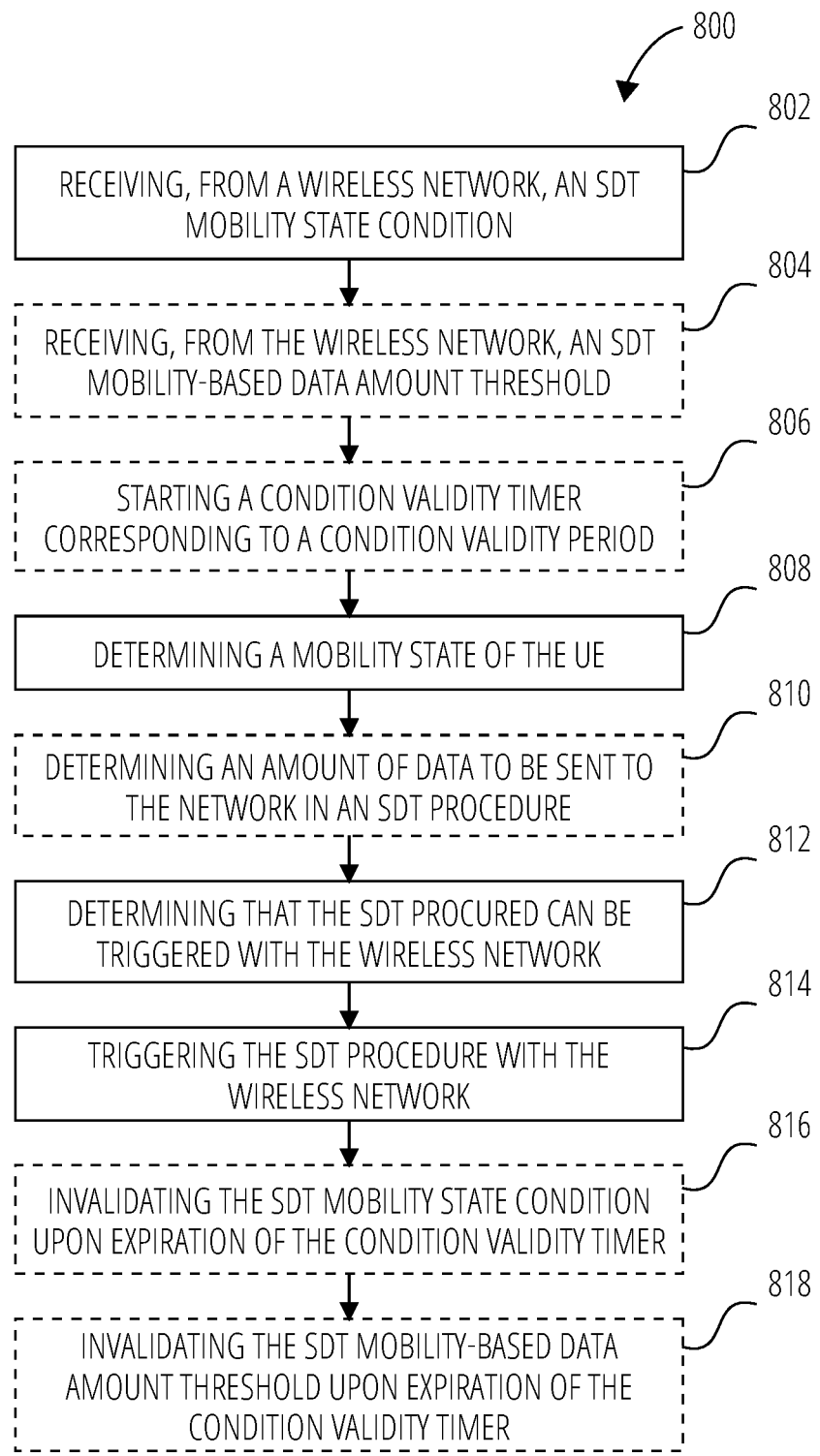
FIG. 8 illustrates a method of a UE, according to some embodiments.

FIG. 8 illustrates a method 800 of a UE, according to some embodiments. The method 800 includes receiving 802, from a wireless network, an SDT mobility state condition.

The method 800 further optionally includes receiving 804, from the wireless network, an SDT mobility-based data amount threshold.

The method 800 further optionally includes starting 806 a condition validity timer corresponding to a condition validity period. The condition validity period may apply to the SDT mobility state condition. The condition validity period may also apply to the SDT mobility-based data amount threshold in embodiments where the UE receives an SDT mobility-based data amount threshold as in the receiving 804.

The method 800 further includes determining 808 a mobility state of the UE.

The method 800 further optionally includes determining 810 an amount of data to be sent in an SDT procedure. This may be done in embodiments where the UE previously received an SDT mobility-based data amount threshold as in the receiving 804.

The method 800 further includes determining 812 that the SDT procedure can be triggered with the wireless network. This determination may be made based on the SDT mobility state condition and the mobility state of the UE. The determination may further be made based on the SDT mobility-based data amount threshold and the amount of data to be sent to the network in the SDT procedure (as determined during the determining 810) in embodiments where the UE previously received an SDT mobility-based data amount threshold as in the receiving 804.

The method 800 further includes triggering 814 the SDT procedure with wireless network.

The method 800 further optionally includes invalidating 816 the SDT mobility state condition upon expiration of the condition validity timer. This may be done in embodiments where the UE previously started a condition validity timer as in the starting 806.

The method 800 further optionally includes invalidating 818 the SDT mobility-based data amount threshold upon expiration of the condition validity timer. This may be done in embodiments where the UE previously started a condition validity timer as in the starting 806, and where the UE previously received an SDT mobility-based data amount threshold as in the receiving 804.

In some embodiments of the method 800, the UE determines that that the SDT procedure can be triggered with the wireless network when the mobility state of the UE is lower than or equal to the SDT mobility state condition.

In some embodiments of the method 800, the SDT mobility state condition is one of a High-mobility state, a Medium-mobility state, and a Normal-mobility state.

In some embodiments of the method 800, a duration of the condition validity timer is configured according to a condition validity timer configuration received from the wireless network.

In some embodiments of the method 800, the SDT mobility state condition is received from the wireless network in an RRCRelease with Suspendconfig message. In some of these embodiments, the RRCRelease with Suspendconfig message is other than a most recent RRCRelease with Suspendconfig message received from the wireless network.

In some embodiments of the method 800, the SDT mobility state condition is received at the UE via dedicated signaling from a base station of the wireless network.

In some embodiments of the method 800, the SDT mobility state condition is received at the UE via broadcast signaling in an SIB from a base station of the wireless network.

Embodiments contemplated herein include an apparatus comprising means to perform one or more elements of the method 800. This apparatus may be, for example, an apparatus of a UE 1200 as described below.

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, the memory 1206 of the UE 1200 described below, and/or the peripheral devices 1404, the memory/storage devices 1414, and/or the databases 1420 of the components 1400 as described below.

Embodiments contemplated herein include an apparatus comprising logic, modules, or circuitry to perform one or more elements of the method 800. This apparatus may be, for example, an apparatus of a UE 1200 as described below.

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a UE 1200 as described below.

Embodiments contemplated herein include a signal as described in or related to one or more elements of the method 800.

Embodiments contemplated herein include a computer program comprising instructions, wherein execution of the program by a processing element is to cause the processing element to carry out one or more elements of the method 800. These instructions may be, for example, the instructions 1412 of the components 1400 as described below.

Figure 9:
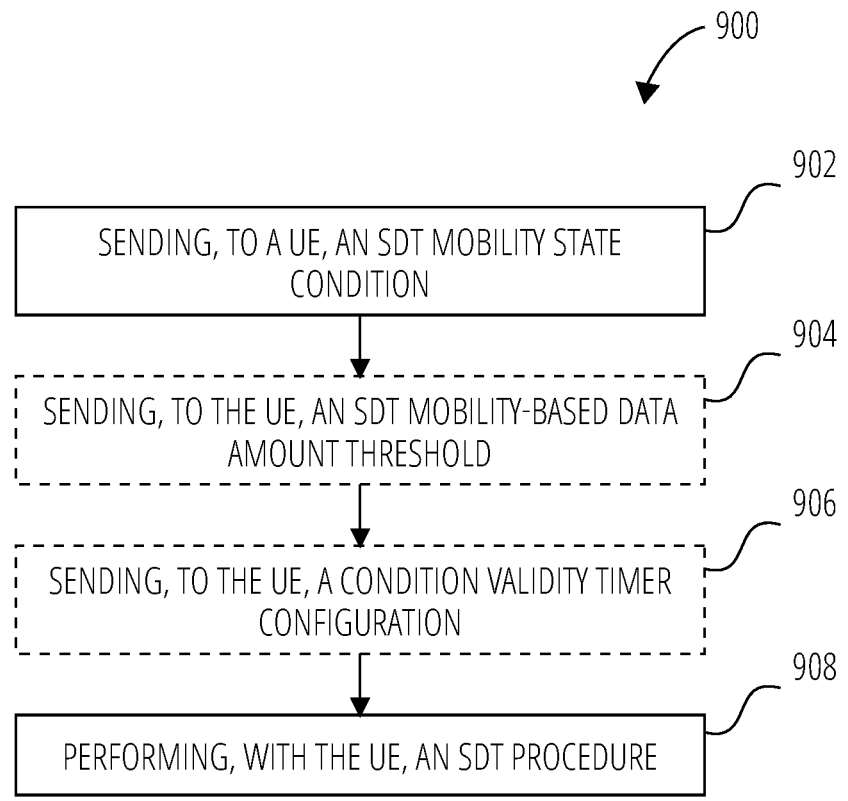
FIG. 9 illustrates a method of a wireless network, according to some embodiments.

FIG. 9 illustrates a method 900 of a wireless network, according to some embodiments. The method 900 includes sending 902, to a UE, an SDT mobility state condition.

The method 900 further optionally includes sending 904, to the UE, an SDT mobility-based data amount threshold.

The method 900 further optionally includes sending 906, to the UE, a condition validity timer configuration.

The method 900 further includes performing 908, with the UE, an SDT procedure.

Embodiments contemplated herein include an apparatus comprising means to perform one or more elements of the method 900. This apparatus may be, for example, an apparatus of a network node 1300 as described below.

Embodiments contemplated herein include one or more non-transitory computer-readable media comprising instructions to cause an electronic device, upon execution of the instructions by one or more processors of the electronic device, to perform one or more elements of the method 900. This non-transitory computer-readable media may be, for example, the memory 1306 of the network node 1300 described below, and/or the peripheral devices 1404, the memory/storage devices 1414, and/or the databases 1420 of the components 1400 as described below.

Embodiments contemplated herein include an apparatus comprising logic, modules, or circuitry to perform one or more elements of the method 900. This apparatus may be, for example, an apparatus of a network node 1300 as described below.

Embodiments contemplated herein include an apparatus comprising: one or more processors and one or more computer-readable media comprising instructions that, when executed by the one or more processors, cause the one or more processors to perform one or more elements of the method 900. This apparatus may be, for example, an apparatus of a network node 1300 as described below.

Embodiments contemplated herein include a signal as described in or related to one or more elements of the method 900.

Embodiments contemplated herein include a computer program comprising instructions, wherein execution of the program by a processing element is to cause the processing element to carry out one or more elements of the method 900. These instructions may be, for example, the instructions 1412 of the components 1400 as described below.

Figure 10:
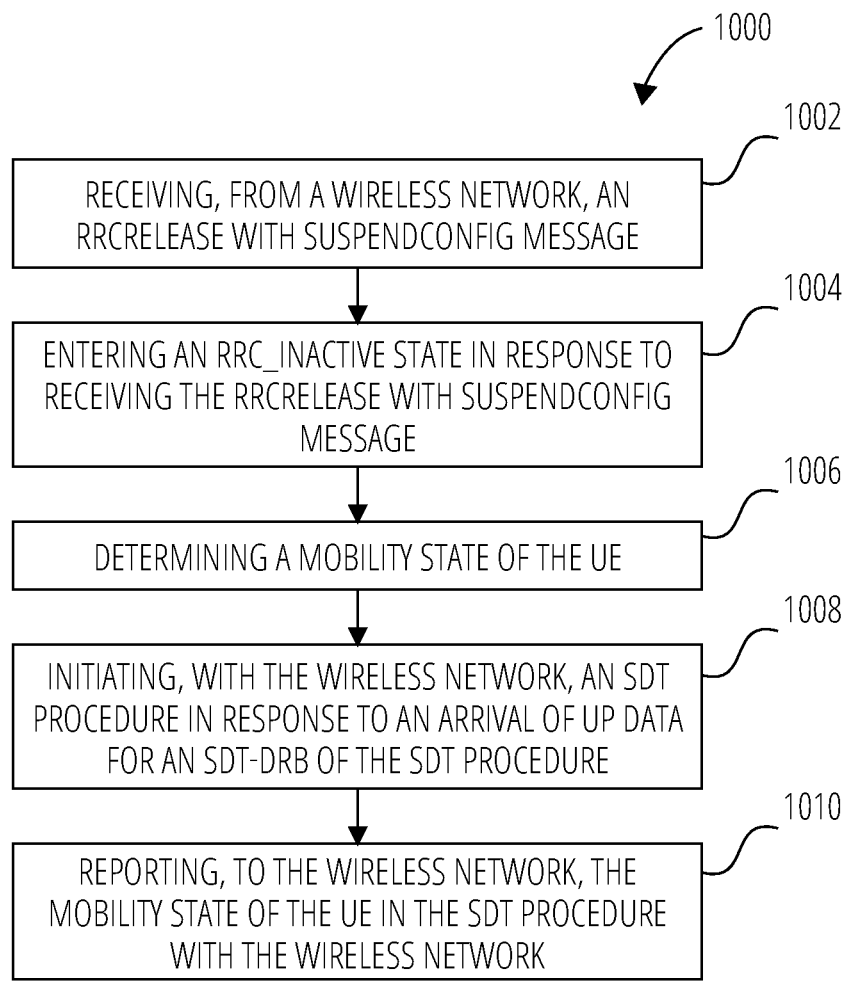
FIG. 10 illustrates a method of a UE, according to some embodiments.

FIG. 10 illustrates a method 1000 of a UE, according to some embodiments. The method 1000 includes receiving 1002, from a wireless network, an RRCRelease with Suspendconfig message.

The method 1000 further includes entering 1004 an RRC_INACTIVE state in response to receiving the RRCRelease with Suspendconfig message.

The method 1000 further includes determining 1006 a mobility state of the UE.

The method 1000 further includes initiating 1008, with the wireless network, an SDT procedure in response to an arrival of data for an SDT-DRB of the SDT procedure.

The method 1000 further includes reporting 1010, to the wireless network, the mobility state of the UE in the SDT procedure with the wireless network.

In some embodiments of the method 1000, the reporting of the mobility state of the UE is performed according to RRC signaling previously received at the UE from the wireless network.

In some embodiments of the method 1000, the reporting of the mobility state of the UE occurs via an inclusion of the mobility state of the UE in an RRCResumeRequest of the SDT procedure.

In some embodiments of the method 1000, the reporting of the mobility state of the UE occurs via a use of a MAC CE after a successful initial access of the SDT procedure.

In some embodiments of the method 1000, the reporting of the mobility state of the UE occurs via L1 signaling of the SDT procedure.

Embodiments contemplated herein include an apparatus comprising means to perform one or more elements of the method 1000. This apparatus may be, for example, an apparatus of a UE 1200 as described below.

Embodiments contemplated herein include one or more non-transitory computer-readable media comprising instructions to cause an electronic device, upon execution of the instructions by one or more processors of the electronic device, to perform one or more elements of the method 1000. This non-transitory computer-readable media may be, for example, the memory 1206 of the UE 1200 described below, and/or the peripheral devices 1404, the memory/storage devices 1414, and/or the databases 1420 of the components 1400 as described below.

Embodiments contemplated herein include an apparatus comprising logic, modules, or circuitry to perform one or more elements of the method 1000. This apparatus may be, for example, an apparatus of a UE 1200 as described below.

Embodiments contemplated herein include an apparatus comprising: one or more processors and one or more computer-readable media comprising instructions that, when executed by the one or more processors, cause the one or more processors to perform one or more elements of the method 1000. This apparatus may be, for example, an apparatus of a UE 1200 as described below.

Embodiments contemplated herein include a signal as described in or related to one or more elements of the method 1000.

Embodiments contemplated herein include a computer program comprising instructions, wherein execution of the program by a processing element is to cause the processing element to carry out one or more elements of the method 1000. These instructions may be, for example, the instructions 1412 of the components 1400 as described below.

Figure 11:
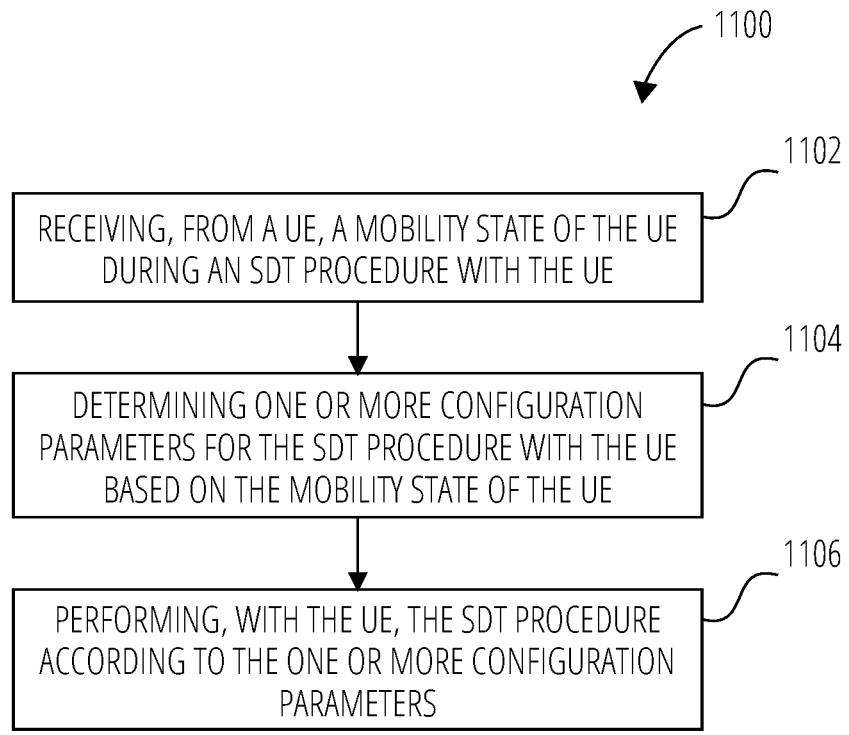
FIG. 11 illustrates a method of a wireless network, according to some embodiments.

FIG. 11 illustrates a method 1100 of a wireless network, according to some embodiments. The method 1100 includes receiving 1102, from a UE, a mobility state of the UE during an SDT procedure with the UE.

The method 1100 further includes determining 1104 one or more configuration parameters for the SDT procedure with the UE based on the mobility state of the UE.

The method 1100 further includes performing 1106, with the UE, the SDT procedure according to the one or more configuration parameters.

In some embodiments of the method 1100, the one or more configuration parameters indicates an SDT mobility state condition to send to the UE as part of the SDT procedure.

In some embodiments of the method 1100, the one or more configuration parameters indicates a maximum lifespan for any configured grants provided to the UE to use during the SDT procedure.

In some embodiments of the method 1100, the one or more configuration parameters indicates a maximum duration to allow the UE to operate within the SDT procedure.

Embodiments contemplated herein include an apparatus comprising means to perform one or more elements of the method 1100. This apparatus may be, for example, an apparatus of a network node 1300 as described below.

Embodiments contemplated herein include one or more non-transitory computer-readable media comprising instructions to cause an electronic device, upon execution of the instructions by one or more processors of the electronic device, to perform one or more elements of the method 1100. This non-transitory computer-readable media may be, for example, the memory 1306 of the network node 1300 described below, and/or the peripheral devices 1404, the memory/storage devices 1414, and/or the databases 1420 of the components 1400 as described below.

Embodiments contemplated herein include an apparatus comprising logic, modules, or circuitry to perform one or more elements of the method 1100. This apparatus may be, for example, an apparatus of a network node 1300 as described below.

Embodiments contemplated herein include an apparatus comprising: one or more processors and one or more computer-readable media comprising instructions that, when executed by the one or more processors, cause the one or more processors to perform one or more elements of the method 1100. This apparatus may be, for example, an apparatus of a network node 1300 as described below.

Embodiments contemplated herein include a signal as described in or related to one or more elements of the method 1100.

Embodiments contemplated herein include a computer program comprising instructions, wherein execution of the program by a processing element is to cause the processing element to carry out one or more elements of the method 1100. These instructions may be, for example, the instructions 1412 of the components 1400 as described below.

Figure 12:
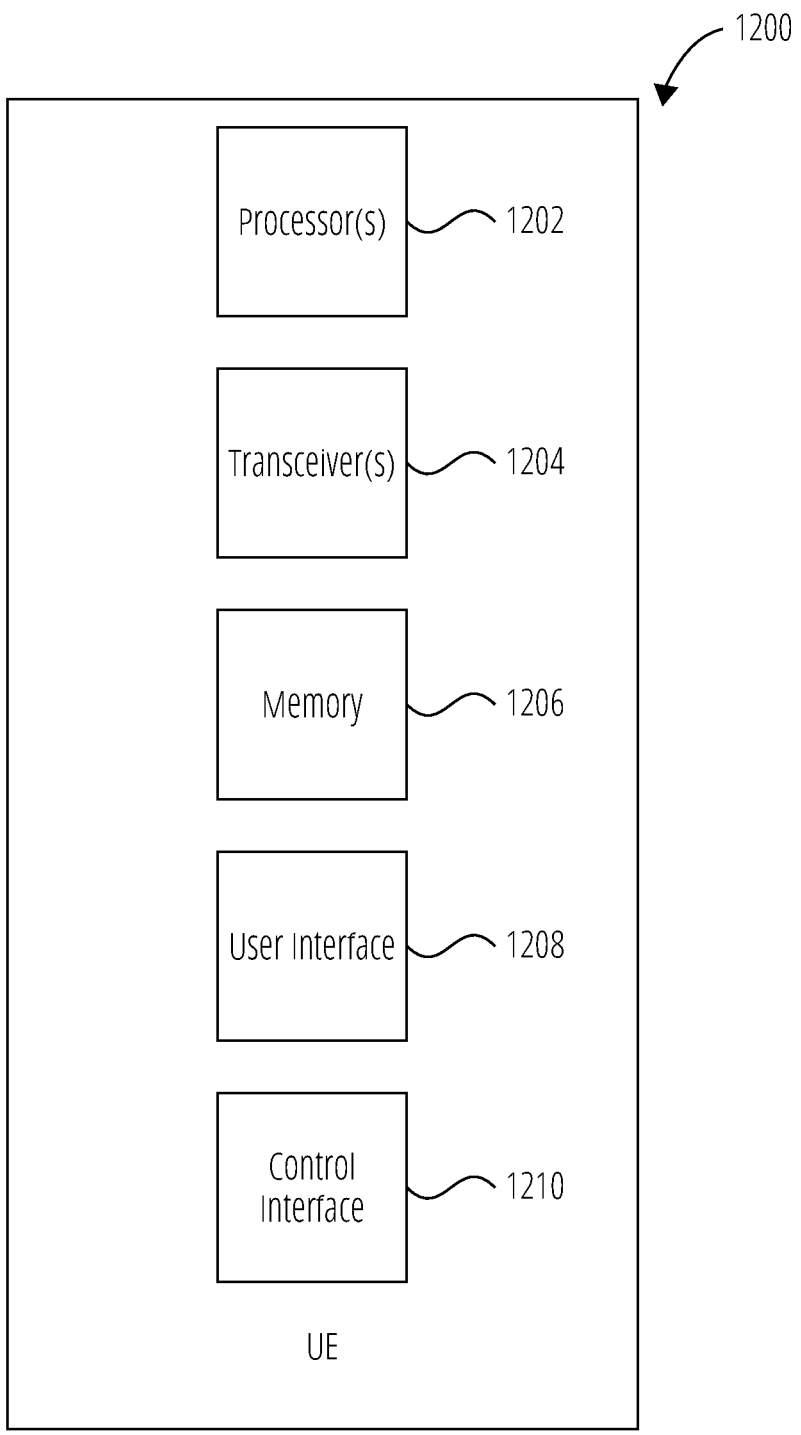
FIG. 12 illustrates a UE in accordance with one embodiment.

FIG. 12 is a block diagram of an example UE 1200 configurable according to various embodiments of the present disclosure, including by execution of instructions on a computer-readable medium that correspond to any of the example methods and/or procedures described herein. The UE 1200 comprises one or more processor 1202, transceiver 1204, memory 1206, user interface 1208, and control interface 1210.

The one or more processor 1202 may include, for example, an application processor, an audio digital signal processor, a central processing unit, and/or one or more baseband processors. Each of the one or more processor 1202 may include internal memory and/or may include interface(s) to communication with external memory (including the memory 1206). The internal or external memory can store software code, programs, and/or instructions for execution by the one or more processor 1202 to configure and/or facilitate the UE 1200 to perform various operations, including operations described herein. For example, execution of the instructions can configure the UE 1200 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1204, user interface 1208, and/or control interface 1210. As another example, the one or more processor 1202 may execute program code stored in the memory 1206 or other memory that corresponds to MAC, RLC, PDCP, and RRC layer protocols standardized by 3GPP (e.g., for NR and/or LTE). As a further example, the processor 1202 may execute program code stored in the memory 1206 or other memory that, together with the one or more transceiver 1204, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1206 may comprise memory area for the one or more processor 1202 to store variables used in protocols, configuration, control, and other functions of the UE 1200, including operations corresponding to, or comprising, any of the example methods and/or procedures described herein. Moreover, the memory 1206 may comprise non-volatile memory (e.g., flash memory), volatile memory (e.g., static or dynamic RAM), or a combination thereof. Furthermore, the memory 1206 may interface with a memory slot by which removable memory cards in one or more formats (e.g., SD Card, Memory Stick, Compact Flash, etc.) can be inserted and removed.

The one or more transceiver 1204 may include radio-frequency transmitter and/or receiver circuitry that facilitates the UE 1200 to communicate with other equipment supporting like wireless communication standards and/or protocols. For example, the one or more transceiver 1204 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1202. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1204 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 1202 to implement a PHY layer based on OFDM, OFDMA, and/or SC-FDMA technologies, such as described herein with respect to other figures.

The user interface 1208 may take various forms depending on particular embodiments, or can be absent from the UE 1200. In some embodiments, the user interface 1208 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1200 may comprise a tablet computing device including a larger touchscreen display. In such embodiments, one or more of the mechanical features of the user interface 1208 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1200 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1200 having a touch screen display are capable of receiving user inputs, such as inputs related to exemplary methods and/or procedures described herein or otherwise known to persons of ordinary skill in the art.

In some exemplary embodiments of the present disclosure, the UE 1200 may include an orientation sensor, which can be used in various ways by features and functions of the UE 1200. For example, the UE 1200 can use outputs of the orientation sensor to determine when a user has changed the physical orientation of the UE 1200's touch screen display. An indication signal from the orientation sensor can be available to any application program executing on the UE 1200, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1210 may take various forms depending on particular embodiments. For example, the control interface 1210 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 1210 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1200 may include more functionality than is shown in FIG. 12 including, for example, a video and/or still-image camera, microphone, media player and/or recorder, etc. Moreover, the one or more transceiver 1204 may include circuitry for communication using additional radio-frequency communication standards including Bluetooth, GPS, and/or others. Moreover, the one or more processor 1202 may execute software code stored in the memory 1206 to control such additional functionality. For example, directional velocity and/or position estimates output from a GPS receiver can be available to any application program executing on the UE 1200, including various exemplary methods and/or computer-readable media according to various exemplary embodiments of the present disclosure.

Figure 13:
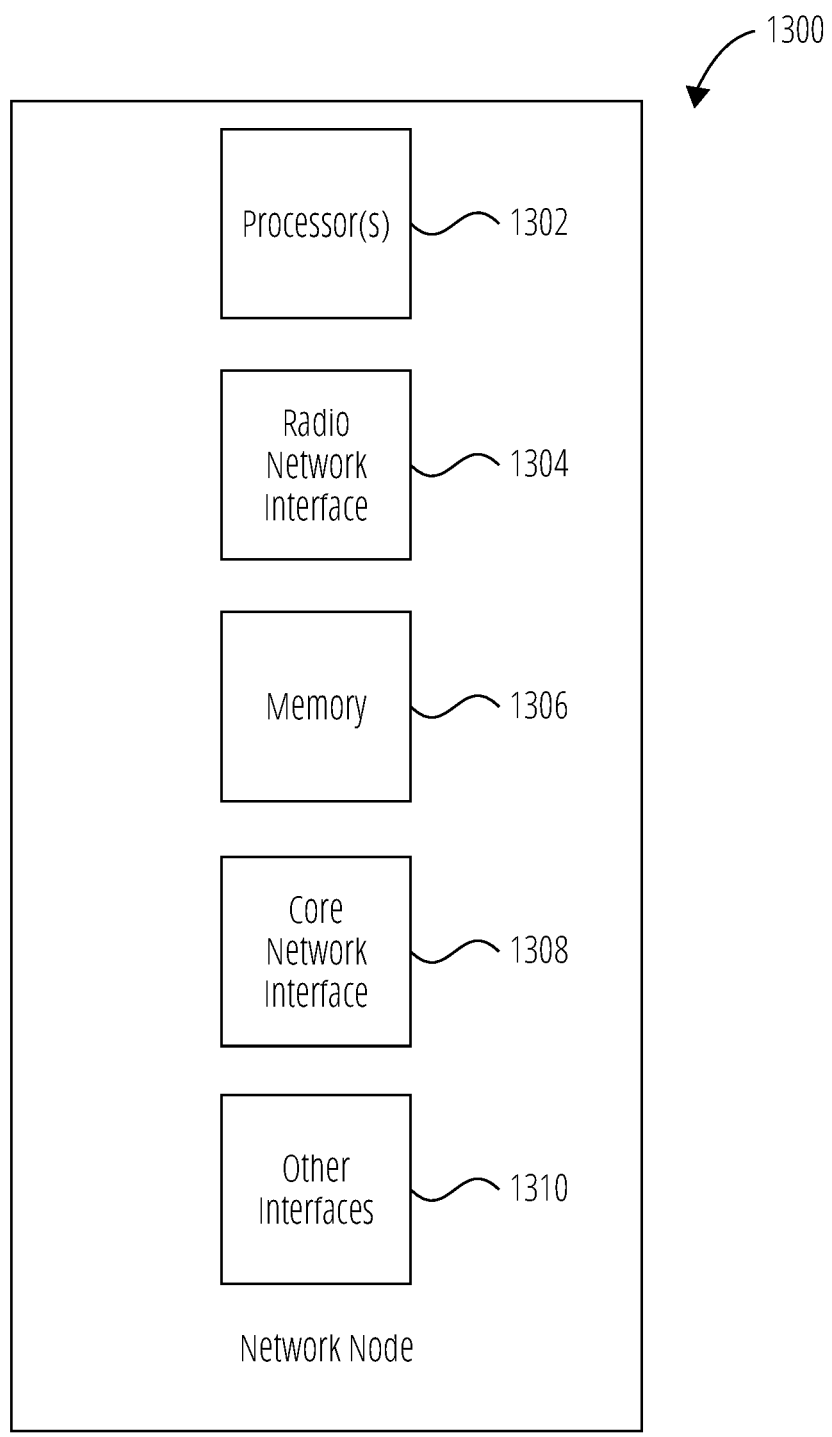
FIG. 13 illustrates a network node in accordance with one embodiment.

FIG. 13 is a block diagram of an example network node 1300 configurable according to various embodiments of the present disclosure, including by execution of instructions on a computer-readable medium that correspond to any of the example methods and/or procedures described herein.

The network node 1300 includes a one or more processor 1302, a radio network interface 1304, a memory 1306, a core network interface 1308, and other interfaces 1310. The network node 1300 may comprise, for example, a base station, eNB, gNB, access node, or component thereof.

The one or more processor 1302 may include any type of processor or processing circuitry and may be configured to perform an of the methods or procedures disclosed herein. The memory 1306 may store software code, programs, and/or instructions executed by the one or more processor 1302 to configure the network node 1300 to perform various operations, including operations described herein. For example, execution of such stored instructions can configure the network node 1300 to communicate with one or more other devices using protocols according to various embodiments of the present disclosure, including one or more methods and/or procedures discussed above. Furthermore, execution of such stored instructions can also configure and/or facilitate the network node 1300 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1304 and the core network interface 1308. By way of example and without limitation, the core network interface 1308 comprise an S1 interface and the radio network interface 1304 may comprise a Uu interface, as standardized by 3GPP. The memory 1306 may also store variables used in protocols, configuration, control, and other functions of the network node 1300. As such, the memory 1306 may comprise non-volatile memory (e.g., flash memory, hard disk, etc.), volatile memory (e.g., static or dynamic RAM), network-based (e.g., "cloud") storage, or a combination thereof.

The radio network interface 1304 may include transmitters, receivers, signal processors, ASICs, antennas, beamforming units, and other circuitry that enables network node 1300 to communicate with other equipment such as, in some embodiments, a plurality of compatible user equipment (UE). In some embodiments, the network node 1300 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1304 may include a PHY layer based on OFDM, OFDMA, and/or SC-FDMA technologies. In some embodiments, the functionality of such a PHY layer can be provided cooperatively by the radio network interface 1304 and the one or more processor 1302.

The core network interface 1308 may include transmitters, receivers, and other circuitry that enables the network node 1300 to communicate with other equipment in a core network such as, in some embodiments, circuit-switched (CS) and/or packet-switched Core (PS) networks. In some embodiments, the core network interface 1308 may include the S1 interface standardized by 3GPP. In some embodiments, the core network interface 1308 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1308 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1310 may include transmitters, receivers, and other circuitry that enables the network node 1300 to communicate with external networks, computers, databases, and the like for purposes of operations, administration, and maintenance of the network node 1300 or other network equipment operably connected thereto.

Figure 14:
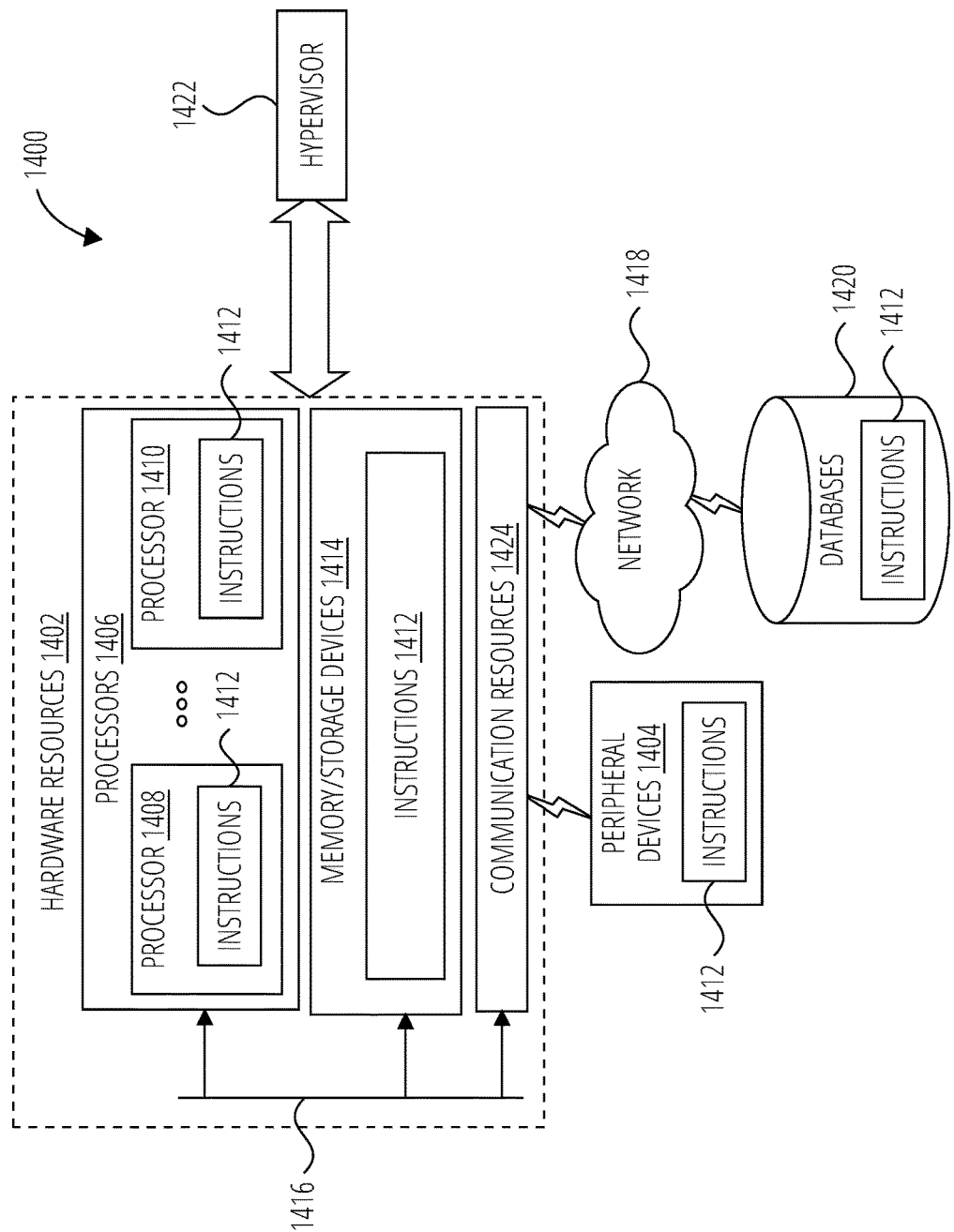
FIG. 14 illustrates components in accordance with one embodiment.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1406 (or processor cores), one or more memory/storage devices 1414, and one or more communication resources 1424, each of which may be communicatively coupled via a bus 1416. For embodiments where node virtualization (e.g., NFV) is utilized, a hypervisor 1422 may be executed to provide an execution environment for one or more network slices/sub-slices to utilize the hardware resources 1402.

The processors 1406 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1408 and a processor 1410.

The memory/storage devices 1414 may include main memory, disk storage, or any suitable combination thereof. The memory/storage devices 1414 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1424 may include interconnection or network interface components or other suitable devices to communicate with one or more peripheral devices 1404 or one or more databases 1420 via a network 1418. For example, the communication resources 1424 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1412 may comprise software, a program, an application, an applet, an app, or other executable code for causing at least any of the processors 1406 to perform any one or more of the methodologies discussed herein. The instructions 1412 may reside, completely or partially, within at least one of the processors 1406 (e.g., within the processor's cache memory), the memory/storage devices 1414, or any suitable combination thereof. Furthermore, any portion of the instructions 1412 may be transferred to the hardware resources 1402 from any combination of the peripheral devices 1404 or the databases 1420. Accordingly, the memory of the processors 1406, the memory/storage devices 1414, the peripheral devices 1404, and the databases 1420 are examples of computer-readable and machine-readable media.

For one or more embodiments, at least one of the components set forth in one or more of the preceding figures may be configured to perform one or more operations, techniques, processes, and/or methods as set forth herein. For example, the baseband circuitry as described above in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:
receiving, from a wireless network, a small data transmission (SDT) mobility state condition;
determining a mobility state of the UE;
determining that an SDT procedure can be triggered with the wireless network based on a comparison of the SDT mobility state condition and the mobility state of the UE;
triggering the SDT procedure with the wireless network; and
reporting, to the wireless network, the mobility state of the UE in the SDT procedure with the wireless network, wherein the reporting of the mobility state of the UE occurs via a use of a medium access control (MAC) control element (CE) after a successful initial access of the SDT procedure.

2. The method of claim 1, further comprising:
starting a condition validity timer corresponding to a condition validity period for the SDT mobility state condition; and
invalidating the SDT mobility state condition upon expiration of the condition validity timer.

3. The method of claim 2, wherein a duration of the condition validity timer is configured according to a condition validity timer configuration received from the wireless network.

4. The method of claim 1, further comprising:
receiving, from the wireless network, an SDT mobility-based data amount threshold; and
determining an amount of data to be sent to the network in the SDT procedure;
wherein the determining that the SDT procedure can be triggered with the wireless network is further based on the SDT mobility-based data amount threshold and the amount of data to be sent to the network in the SDT procedure.

5. The method of claim 4, further comprising:
starting a condition validity timer corresponding to a condition validity period for the SDT mobility state condition and the SDT mobility-based data amount threshold; and
invalidating the SDT mobility state condition and the SDT mobility state condition upon expiration of the condition validity timer.

6. The method of claim 1, wherein the UE determines that that the SDT procedure can be triggered with the wireless network when the mobility state of the UE is lower than or equal to the SDT mobility state condition.

7. The method of claim 1, wherein the SDT mobility state condition is one of a High-mobility state, a Medium-mobility state, and a Normal-mobility state.

8. The method of claim 1, wherein the SDT mobility state condition is received from the wireless network in an RRCRelease with Suspendconfig message.

9. The method of claim 8, wherein the RRCRelease with Suspendconfig message is other than a most recent RRCRelease with Suspendconfig message received from the wireless network.

10. The method of claim 1, wherein the SDT mobility state condition is received at the UE via dedicated signaling from a base station of the wireless network.

11. The method of claim 1, wherein the SDT mobility state condition is received at the UE via broadcast signaling in a system information block (SIB) from a base station of the wireless network.

12. A method of a user equipment (UE), comprising:
receiving, from a wireless network, an RRCRelease with Suspendconfig message;
entering an RRC_INACTIVE state in response to receiving the RRCRelease with Suspendconfig message;
determining a mobility state of the UE;
initiating, with the wireless network, a small data transmission (SDT) procedure in response to an arrival of data for an SDT data radio bearer (SDT-DRB) of the SDT procedure and a determination that the SDT procedure can be triggered based on a comparison of a SDT mobility state condition and the mobility state of the UE; and
reporting, to the wireless network, the mobility state of the UE in the SDT procedure with the wireless network, wherein the reporting of the mobility state of the UE occurs via a use of a medium access control (MAC) control element (CE) after a successful initial access of the SDT procedure.

13. The method of claim 12, wherein the reporting of the mobility state of the UE is performed according to RRC signaling previously received at the UE from the wireless network.

14. A method of a wireless network, comprising:
receiving, from a user equipment (UE), a mobility state of the UE during a small data transmission (SDT) procedure with the UE for pending SDT data at the UE, wherein the mobility state of the UE is received via a use of a medium access control (MAC) control element (CE) after a successful initial access of the SDT procedure;
determining one or more configuration parameters for the SDT procedure with the UE based on the mobility state of the UE; and
performing, with the UE, the SDT procedure according to the one or more configuration parameters.

15. The method of claim 14, wherein the one or more configuration parameters indicates an SDT mobility state condition to send to the UE as part of the SDT procedure.

16. The method of claim 14, wherein the one or more configuration parameters indicates a maximum lifespan for any configured grants provided to the UE to use during the SDT procedure.

17. The method of claim 14, wherein the one or more configuration parameters indicates a maximum duration to allow the UE to operate within the SDT procedure.

* * * * *